United States Patent
Lohr et al.

(10) Patent No.: US 10,581,039 B2
(45) Date of Patent: Mar. 3, 2020

(54) TRACTION BATTERY ASSEMBLY

(71) Applicant: Ford Global Technologies, LLC, Dearborn, MI (US)

(72) Inventors: Jonathan Lohr, Canton, MI (US); Hyung Min Baek, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1062 days.

(21) Appl. No.: 14/689,333

(22) Filed: Apr. 17, 2015

(65) Prior Publication Data

US 2016/0308179 A1  Oct. 20, 2016

(51) Int. Cl.
| H01M 10/60 | (2014.01) |
| H01M 2/10 | (2006.01) |
| H01M 2/12 | (2006.01) |
| H01M 10/6555 | (2014.01) |
| H01M 10/625 | (2014.01) |

(52) U.S. Cl.
CPC ....... *H01M 2/1077* (2013.01); *H01M 2/1083* (2013.01); *H01M 2/12* (2013.01); *H01M 10/625* (2015.04); *H01M 10/6555* (2015.04); *H01M 2220/20* (2013.01)

(58) Field of Classification Search
None
See application file for complete search history.

(56) References Cited

U.S. PATENT DOCUMENTS

| 8,895,177 B2 | 11/2014 | Marchio et al. |
| 2010/0136390 A1 | 6/2010 | Ueda et al. |

| 2011/0045334 A1* | 2/2011 | Meintschel | H01M 2/206 429/120 |
| 2012/0028099 A1* | 2/2012 | Aoki | H01M 2/1077 429/120 |
| 2012/0129024 A1* | 5/2012 | Marchio | H01M 2/1252 429/87 |
| 2014/0322582 A1* | 10/2014 | Ruter | H01M 2/1072 429/120 |

FOREIGN PATENT DOCUMENTS

| CN | 101740802 A | 6/2010 |
| CN | 102544569 A | 7/2012 |
| DE | 102010050993 A1 | 5/2012 |
| KR | 20140063205 A | 5/2014 |
| WO | 2014029566 A1 | 2/2014 |
| WO | 2015026202 A1 | 2/2015 |

OTHER PUBLICATIONS

Chinese Office Action dated Jan. 6, 2020 (and English Abstract) for CN Appn. No. 201610258305.1, 9 pgs.

* cited by examiner

*Primary Examiner* — Lucas J. O'Donnell
(74) *Attorney, Agent, or Firm* — David Kelley; Brooks Kushman, P.C.

(57) ABSTRACT

A traction-battery assembly includes a retention structure having a separator and first and second openings on opposing sides of the separator. The assembly also includes first and second arrays each having cells arranged such that terminals of the cells are on a terminal side of the array. The terminal sides of the first and second arrays are each disposed in one of the first or second openings such that the terminal sides face the separator.

20 Claims, 4 Drawing Sheets

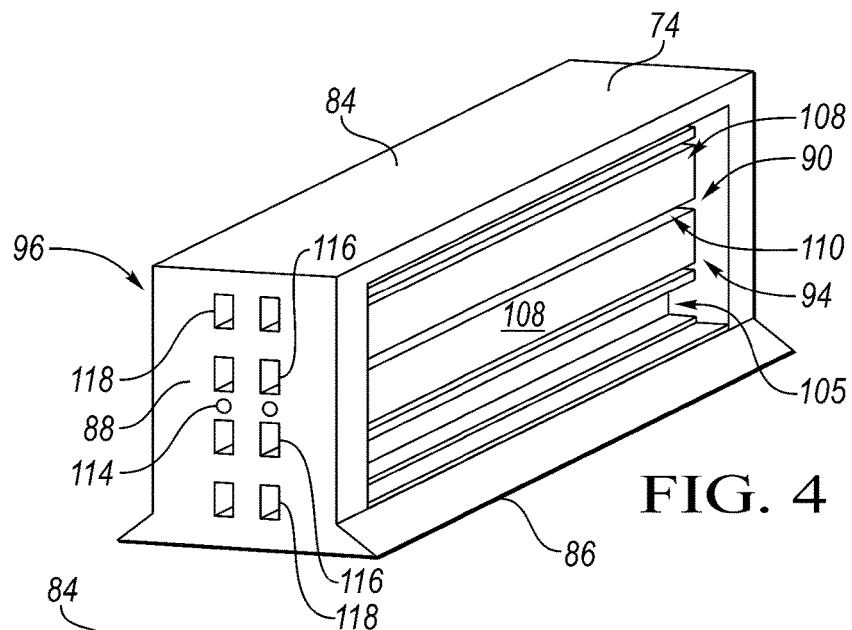
FIG. 4
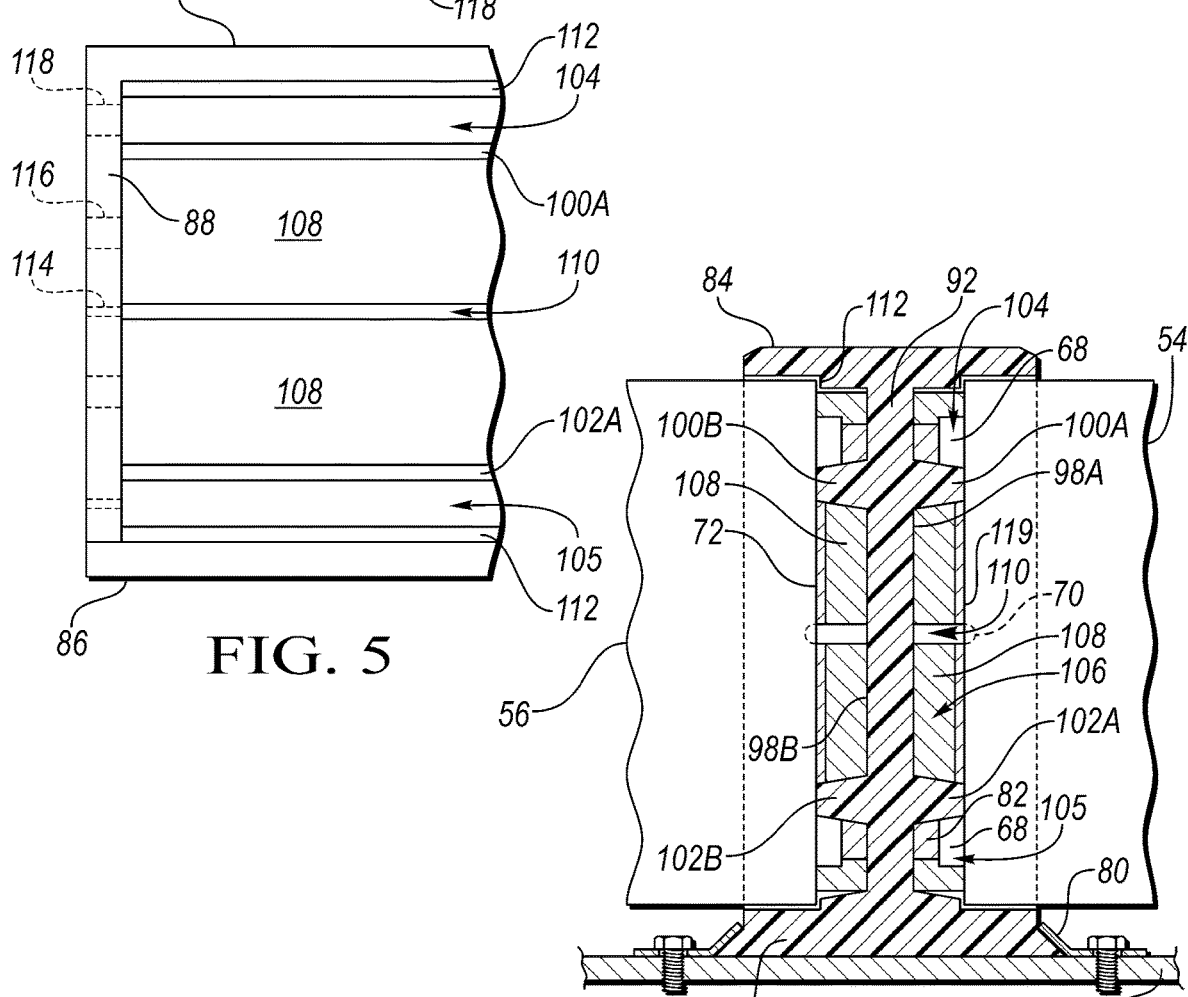
FIG. 5
FIG. 6

TRACTION BATTERY ASSEMBLY

TECHNICAL FIELD

The present disclosure relates to traction-battery assemblies for motor vehicles.

BACKGROUND

Vehicles such as battery-electric vehicles and hybrid-electric vehicles contain a traction-battery assembly to act as an energy source for the vehicle. The traction battery may include components and systems to assist in managing vehicle performance and operations. The traction battery may also include high voltage components, and an air or liquid thermal-management system to control the temperature of the battery.

SUMMARY

According to one embodiment, a traction-battery assembly includes a retention structure having a separator and first and second openings on opposing sides of the separator. The assembly also includes first and second arrays each having cells arranged such that terminals of the cells are on a terminal side of the array. The terminal sides of the first and second arrays are each disposed in one of the first or second openings such that the terminal sides face the separator.

According to another embodiment, a traction-battery assembly includes a retention structure defining a pair of receiving portions on opposite sides of the structure. Each of the portions have an inboard wall with a thermal plate thereon. The assembly also includes a pair of arrays each having cells with terminals arranged on a terminal side of the array. Each of the receiving portions has a portion of one of the arrays disposed therein such that the terminal side is touching the thermal plate.

According to yet another embodiment, a traction-battery assembly includes a pair of cells each having a terminal side with at least one terminal. The cells are arranged such that the terminal side of one the cells faces the terminal side of the other of the cells and such that the terminal sides are spaced apart from each other. At least one thermal plate is disposed between the cells and is touching at least one of the terminal sides.

BRIEF DESCRIPTION OF THE DRAWINGS

FIG. 4 is perspective view of a retention structure of the traction-battery assembly shown in FIG. 2.

FIG. 5 is a fragmented front view of the retention structure shown in FIG. 4.

FIG. 6 is a fragmented side view, in cross section, of the traction-battery assembly shown in FIG. 2 along cut line 6-6.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
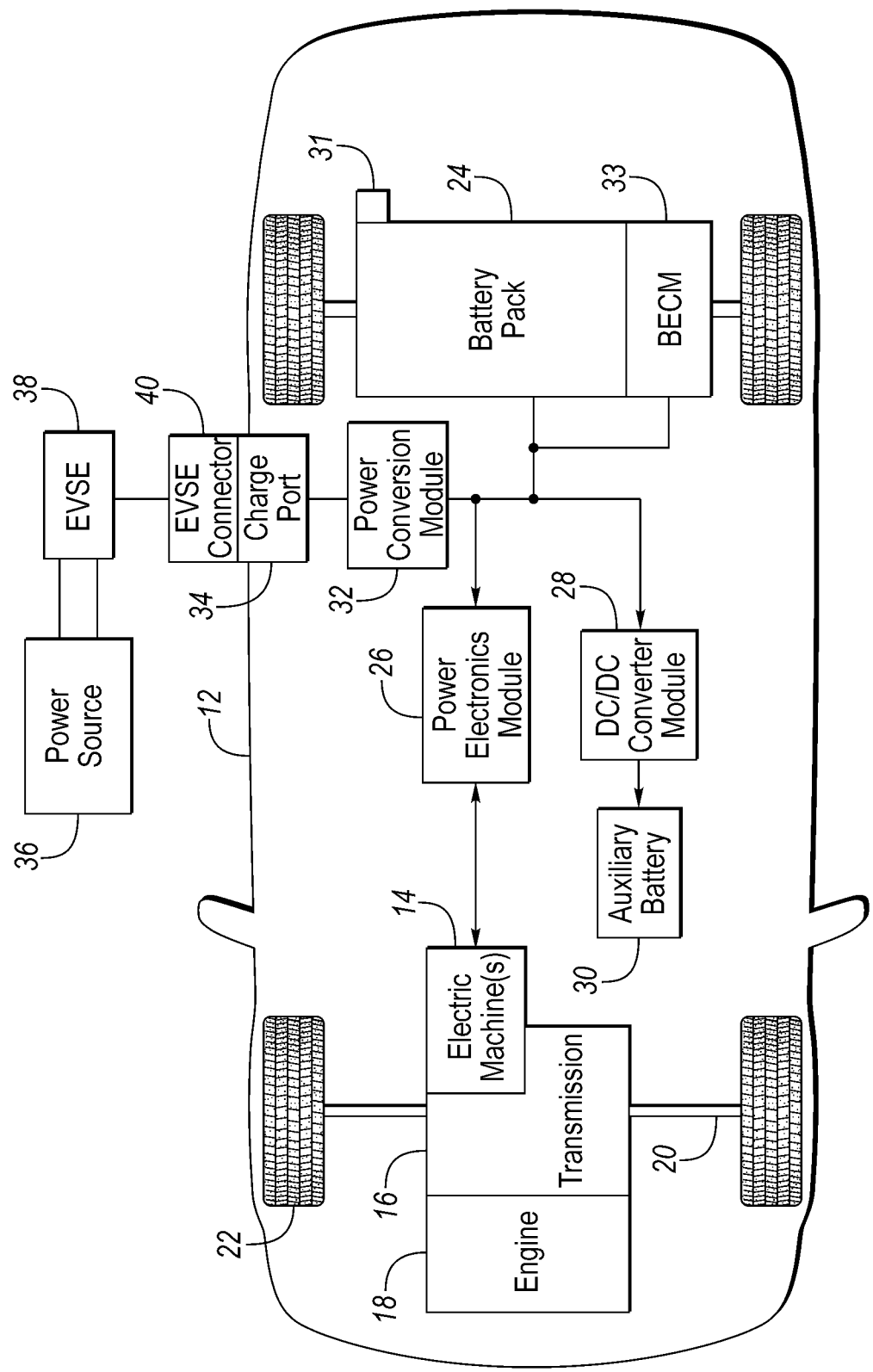
FIG. 1 is a schematic diagram of an example hybrid vehicle.

FIG. 1 depicts a schematic of a typical plug-in hybrid-electric vehicle (PHEV). Certain embodiments, however, may also be implemented within the context of non-plug-in hybrids and fully-electric vehicles. The vehicle 12 includes one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy through regenerative braking. The electric machines 14 reduce pollutant emissions and increase fuel economy by reducing the work load of the engine 18.

A fraction battery or battery pack 24 stores energy that can be used by the electric machines 14. The fraction battery 24 typically provides a high voltage direct current (DC) output from one or more battery cell arrays, sometimes referred to as battery cell stacks, within the traction battery 24. The battery cell arrays may include one or more battery cells.

The battery cells, such as a prismatic or pouch cell convert stored chemical energy to electrical energy. The cells may include a housing, a positive electrode (cathode) and a negative electrode (anode). An electrolyte may allow ions to move between the anode and cathode during discharge, and then return during recharge. Terminals may allow current to flow out of the cell for use by the vehicle.

Different battery pack configurations may be available to address individual vehicle variables including packaging constraints and power requirements. The battery cells may be thermally regulated with a thermal management system. Examples of thermal management systems include air cooling systems, liquid cooling systems and a combination of air and liquid systems.

The traction battery 24 may be electrically connected to one or more power electronics modules 26 through one or more contactors (not shown). The one or more contactors isolate the traction battery 24 from other components when opened and connect the traction battery 24 to other components when closed. The power electronics module 26 may be electrically connected to the electric machines 14 and may provide the ability to bi-directionally transfer electrical energy between the traction battery 24 and the electric machines 14. For example, a typical traction battery 24 may provide a DC voltage while the electric machines 14 may require a three-phase alternating current (AC) voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a fully-electric vehicle. In a fully-electric vehicle, the hybrid transmission 16 may be a gear box connected to an electric machine 14 and the engine 18 is not present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle components. Other high-voltage loads, such as compressors and electric heaters, may be connected directly to the high-voltage supply without the use of a DC/DC converter module 28. In a typical vehicle, the low-voltage systems are electrically connected to an auxiliary battery 30 (e.g., a 12 volt battery).

A battery energy control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24.

The vehicle 12 may be recharged by an external power source 36. The external power source 36 is a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via dedicated electrical conduits.

Figure 2:
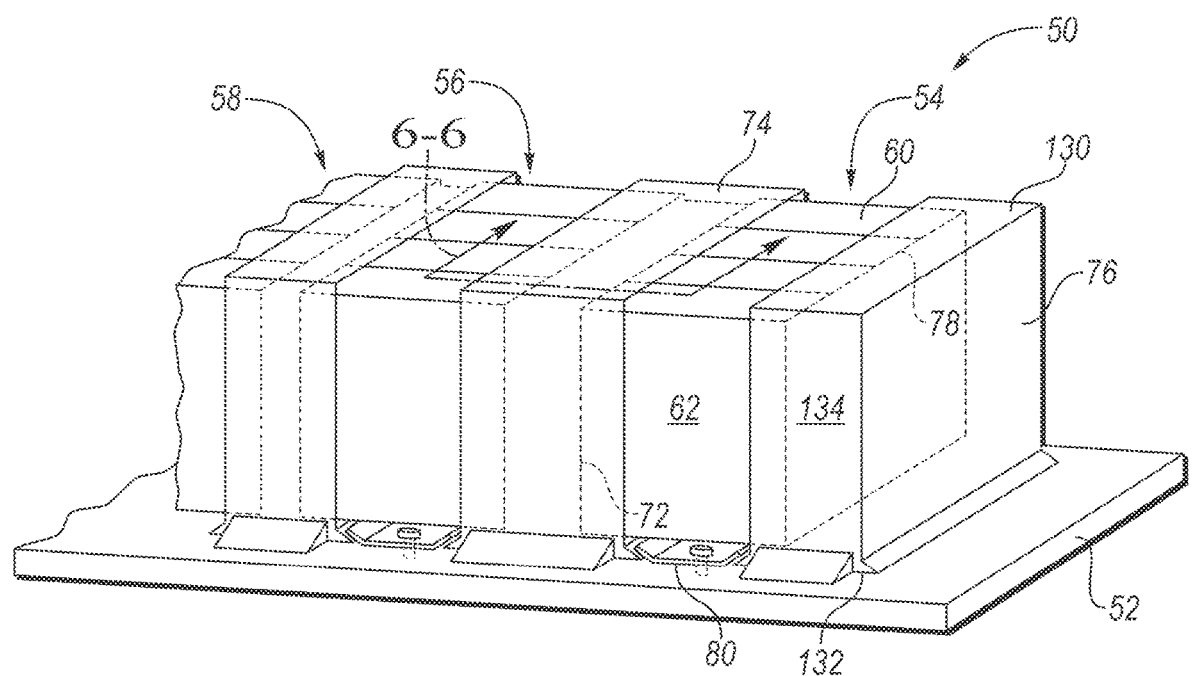
FIG. 2 is a fragmented perspective view of a traction-battery assembly.
Figure 3:
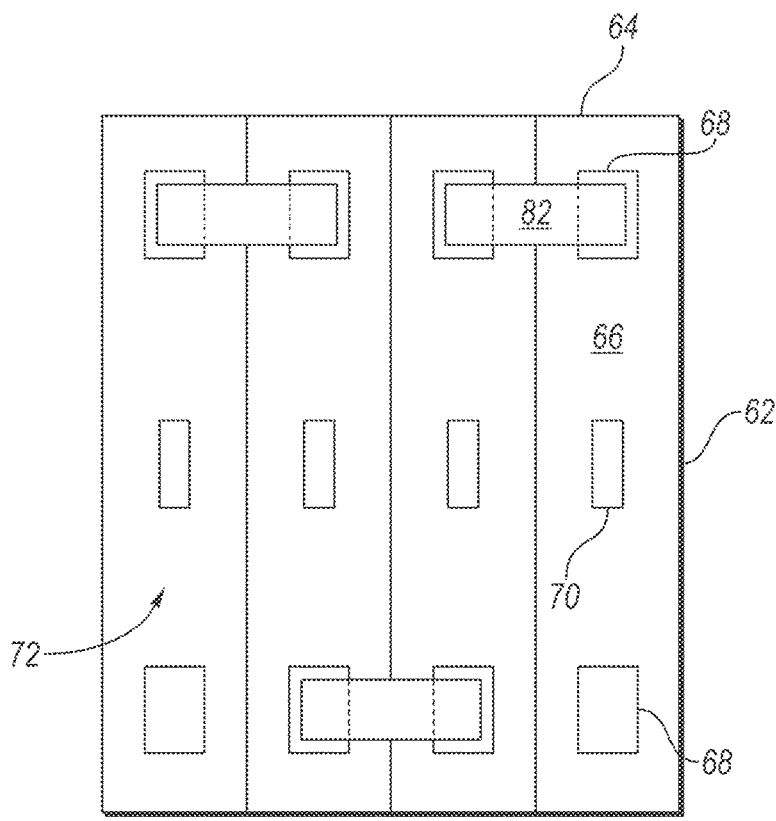
FIG. 3 is a side view of a battery array of the traction-battery assembly shown in FIG. 2.

FIGS. 2 through 9 and the related discussion, describe examples of the traction battery assembly 24. Referring to FIGS. 2 and 3, a traction battery assembly 50 includes a plurality of battery arrays attached to a tray 52. For example, FIG. 2 illustrates a first array 54, a second array 56, and a portion of a third array 58. The traction-battery assembly 50 may include more or less arrays. Each of the arrays includes a plurality of battery cells 60 having major sides 62 and minor sides 64. While each array is illustrated as having four cells, it is understood that each array may have significantly more cells. The cells 60 are stacked in the array with the major sides 62 of adjacent cells abutting each other. One of the minor sides 64 includes at least one terminal 68. This side is known as the terminal side 66 of the cell 60. The cells 60 may be arranged in the arrays such that all of the terminal sides 66 are on a same side of the array and collectively define a terminal side 72 of the array. Each of the cells 60 also includes a vent 70 disposed on the terminal side 66. The vents 70 are configured to release gas from the internal chamber of the cell 60 if pressure inside the cell exceeds a threshold value. The vents 70 may be located between the terminals 68. Select terminals of the cells are electrically connected with busbars 82. The busbars may be arranged to electrically connect the cells in series or parallel. FIG. 3 illustrates the cells 60 electrically connected in series.

Each of the arrays may be secured to the tray via a pair of retention structures. For example, the first array 54 is secured to the tray 52 at the terminal side 72 via a first retention structure 74 and is secured to the tray at side 78 via a second retention structure 76. Each of the retention structures includes features for attaching the retention structure to the tray 52. For example, bracketry 80 may be used to clamp a lower portion of the retention structure to a top of the tray 52.

Referring to FIGS. 4, 5, and 6, the first retention structure 74 may include a top 84, a bottom 86, and a pair of sidewalls 88 interconnected to define an interior 90. A separator 92 may extend between the top 84, bottom 86, and sidewalls 88 within the interior 90. The separator 92 partitions the interior 90 into a first opening 94 and a second opening 96. The opening may also be known as receiving portions. The separator 92 includes a pair of major surfaces 98A and 98B. The major surfaces define an inboard wall of the receiving portions. The separator 92 may include a first projection 100A and a second projection 102A extending from the major surface 98A. The separator 92 may also include a first projection 100B and a second projection 102B extending from the major surface 98B. A first terminal channel 104 may be defined between the top 84 and the first projection 100A. A second terminal channel 105 may be defined between the bottom 86 and the second projection 102A. The first and second projections 100A, 102A cooperate to define a recess 106. The separator 92 may also include similar channels and recesses on the second major surface 98B.

At least one thermal plate 108 is received within each of the recesses 106. For example, two thermal plates may be received within each of the recesses 106. The thermal plates 108 may be bonded to the separator 92 with adhesive or other attachment methods. The thermal plates are spaced apart from each other and cooperate with the major surface 98 to define a vent channel 110. The vent channel 110 is in fluid communication with a vent port 114 defined in one of the sidewalls 88. The retention structure 74 may include at least one cooling port 116 that is in fluid communication with one of the thermal plates 108. The retention structure 74 may also include electrical ports 118 for providing access to the terminal channels 104. In some embodiments, each of the ports may be disposed on one of the sidewalls 88. A bulk head (not shown) may connect to the sidewall 88 and include conduits connectable with each of the ports for interconnecting the ports of one retention structure to other retention structures.

The terminal side 72 of the first array 54 is receivable within the first opening 94 and the terminal side 72 of the second array 56 is receivable within the second opening 96. The separator 92 electrically isolates the first and second arrays from each other. The first array 54 may be received within the opening 94 such that the terminals 68 are disposed within the terminal channels 104, 105 and such that the vents 70 are aligned with the vent channel 110. A distal end of each of the projections 100, 102 engages with the terminal side 72 and acts as a stopper. The retention structure 74 may also include ledges 112 that also act as a stopper. When received, the terminal side 72 engages with the thermal plates 108. A thermally conductive adhesive 119 may be applied between the thermal plates 108 and the terminal side 66 of each cell 60. The second array 56 may be similarly received within the retention structure 74.

Figure 7:
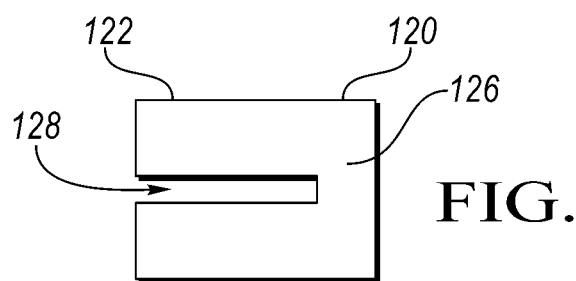
FIG. 7 is a schematic diagram of a thermal plate.

Referring to FIG. 7, in an alternative embodiment the pair of thermal plates 108 may be replaced with a single U-shaped thermal plate 120 that is disposed in each of the recesses 106. The thermal plate 120 may include a first branch 122 and a second branch 124. The first and second branches interconnected at a connecting region 126 and define a gap 128. The gap 128 cooperates with the major surface 98 to define a vent channel when installed in a retention structure.

Referring to FIG. 2, the second retention structure 76 may include a top 130, a bottom 132, and sidewalls 134 interconnected to define an opening. The opening is configured to receive the end 78 therein. Depending upon the location of the second retention structure, the retention structure 76 may include one opening as is illustrated in FIG. 2, or may include a pair of openings on each side of the structure 76.

Figure 8:
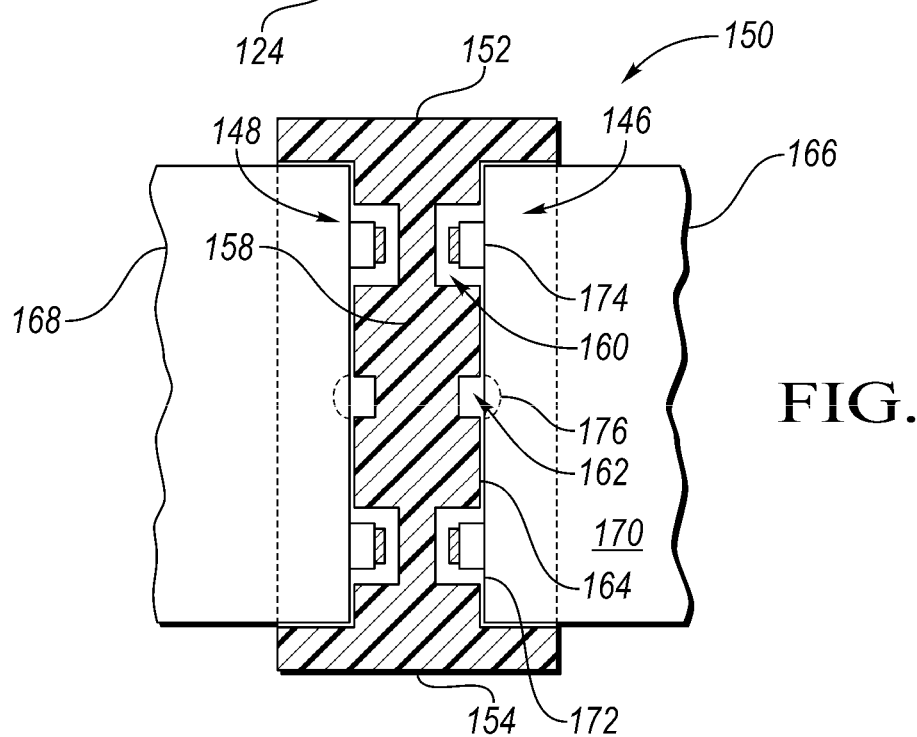
FIG. 8 is a fragmented side view, in cross section, of another traction-battery assembly.

Referring to FIG. 8, a cross-sectional view of another retention structure 150 is illustrated. The retention structure 150 may include a top 152, a bottom 154, and sidewalls that are interconnected forming an outer housing. A separator 158 may extend between the top, bottom, and sidewalls. The outer housing and separator cooperate to define a first opening 146 and a second opening 148. The separator 158 may define terminal channels 160 recessed into a cell engaging surface 164 of the separator. The separator 158 may also define vent channels 162. A first battery array 166 is receivable in the first opening 146 and a second battery array 168 is receivable in the second opening 148. The first battery array 166 may be received within the retention structure 150 such that a terminal side 172 of the cells 170 is disposed against the cell engaging surface 164 of the separator 158. The terminals 174 of the cells are received within the terminal channels 160, and the vents 176 of the cells 170 are aligned with the vent channel 162. The second battery array 168 may be received within the second opening 148 similarly to the first array 166.

Figure 9:
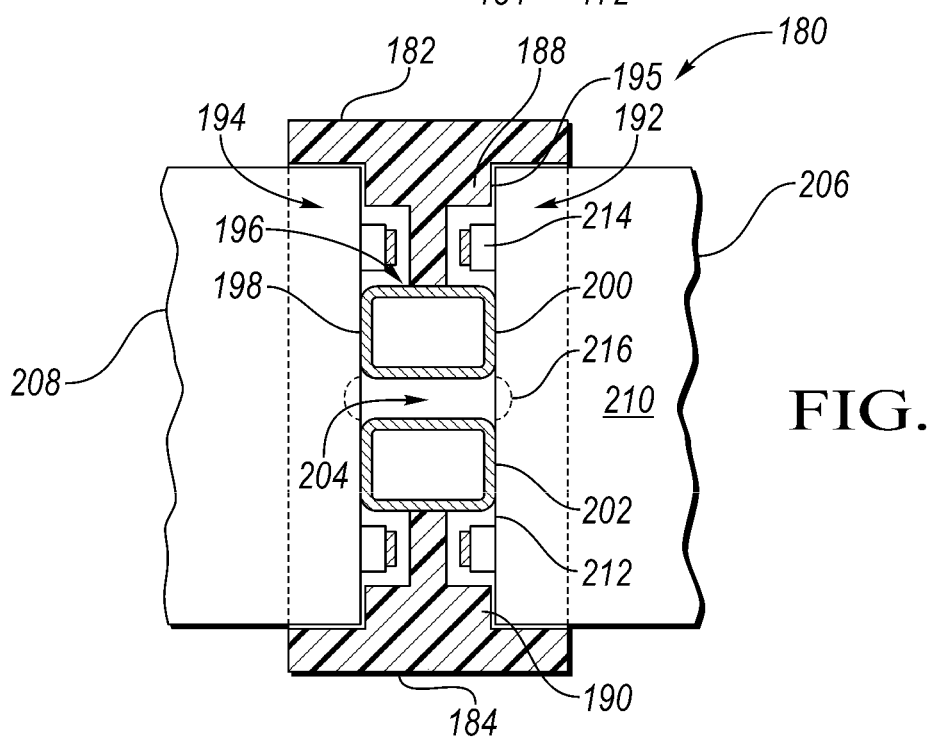
FIG. 9 is a fragmented side view, in cross section, of yet another traction-battery assembly.

Referring to FIG. 9, a cross-sectional view of another retention structure 180 is illustrated. The retention structure 180 may include a top 182, a bottom 184, and sidewalls that are interconnected forming an outer housing. A first separator 188 is connected to the top 182 and the sidewalls and extends downwardly therefrom. A second separator 190 is connected to the bottom 184 and the sidewalls and extends upwardly therefrom. At least one thermal plate 198 may be disposed within a space defined between the first and second separators. For example, the thermal plate 198 is a U-shaped thermal plate having a first branch 200 and a second branch 202. The branches 200, 202 are spaced apart defining a vent channel 204. Alternatively, the thermal plate 198 may be a pair of thermal plates that cooperate to define a vent channel. In an alternative embodiment, the separators may be a single separator having a top portion and a bottom portion separated by an opening.

The retention structure 180 includes a first receiving portion 192 and the second receiving portion 194. The receiving portions may be separated by the first and second separators and the thermal plate 198. Each of the receiving portions may include ledges 195 and terminal channels 196. A first array 206 is received within the first receiving portion 192, and the second array 208 is received within the second receiving portion 194. The first array 206 is received such that the terminal side 212 of the cells 210 are disposed against the ledges 195 and the thermal plate 198. The vents 216 are aligned with the vent channel 204 and the terminals 214 are received in the channels 196. The second array 208 may be received within the second receiving portion 194 similarly to the first array 206.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A traction-battery assembly comprising:
   a retention structure including a top, a bottom, and a separator cooperating to define opposing openings on opposite sides of the separator;
   first and second arrays received in the opposing openings, respectively, with terminal sides of the arrays facing the separator and the top and bottom extending over the arrays; and
   first and second heat exchangers attached to opposing major sides of the separator and engaging the arrays.

2. The assembly of claim 1 wherein the separator includes a main portion defining the major sides, a first projection extending outwardly from one of the major sides and engaging with the terminal side the first arrays to create a first gap between the main portion and the terminal side of the first array, and a second projection extending outwardly from the other of the major side and engage with the terminal side of the second array to create a second gap between the main portion and the terminal side of the second array.

3. The assembly of claim 2 wherein the first array includes at least one terminal disposed in the first gap and the second array includes at least one terminal disposed in the second gap.

4. The assembly of claim 3 wherein the first array includes a busbar attached to the terminal of the first array and disposed in the first gap, and the second array includes a busbar attached to the terminal of the second array and disposed in the second gap.

5. The assembly of claim 1 further comprising a third heat exchanger attached to the same opposing major side as the first heat exchanger as the first heat exchanger, and a fourth heat exchanger attached to the same opposing major side as the second heat exchanger, wherein the third heat exchanger engages with the terminal side of the first array, and the fourth heat exchanger engages with the terminal side of the second array.

6. The assembly of claim 5 wherein the first array includes a plurality of cell each have a vent located on the terminal side of the first array, and the first and third heat exchangers are spaced apart and cooperate with the separator to define a vent channel and the vents open into the vent channel.

7. The assembly of claim 6 wherein the retention structure further includes a sidewall oriented perpendicular to the separator and interconnected with the top and the bottom, the sidewall defining a vent port that is in fluid communication with the vent channel.

8. A traction-battery assembly comprising:
a retention structure defining a pair of receiving portions on opposite sides of the structure, the portions each having an inboard wall with a heat exchanger thereon; and
a pair of arrays each including cells having terminals arranged on a terminal side of the array, wherein each of the receiving portions has a portion of one of the arrays disposed therein such that the terminal side is touching the heat exchanger.

9. The assembly of claim 8 wherein the retention structure includes at least two heat exchangers disposed on each of the inboard walls and wherein the heat exchangers disposed on a same inboard wall are spaced apart and cooperate to define a channel.

10. The assembly of claim 9 wherein each of the cells includes a vent that is located on the terminal side of the array and wherein at least one of the vents is in fluid communication with the channel.

11. The assembly of claim 10 wherein the retention structure further includes a port in fluid communication with the channel such that gases released from the vent can exit the retention structure via the port.

12. The assembly of claim 8 wherein each of the heat exchangers includes a first branch and a second branch spaced apart and cooperating to define a channel that is in fluid communication with a port defined in an exterior of the retention structure.

13. The assembly of claim 8 wherein each of the inboard walls further includes a pair of projections extending outwardly therefrom, wherein the projections and inboard walls cooperate to define recesses, and wherein each of the heat exchangers are disposed in an associated one of the recesses.

14. The assembly of claim 8 wherein each of the inboard walls defines at least one channel and at least one of the terminals is disposed within the channel.

15. A traction-battery assembly comprising:
a pair of cells each including a terminal side having at least one terminal, the cells being arranged with the terminal sides spaced apart and facing each other; and
a U-shaped heat exchanger disposed between the cells and touching each of the terminal sides.

16. The assembly of claim 15 wherein the heat exchanger includes a first branch and a second branch that cooperate to define a gap that forms a vent channel.

17. The assembly of claim 16 wherein each of the cells includes a vent disposed on the terminal side, wherein the cells are arranged with the vents opening into the vent channel.

18. The assembly of claim 15 further comprising a retention structure including a top portion, a bottom portion, a first separator wall extending downward from the top portion, and a second separator wall extending upward from the bottom portion, wherein the first and second separator walls are spaced apart and the U-shaped heat exchanger is disposed between the first and second separator walls.

19. The assembly of claim 18 wherein each of the cells are prismatic and have opposing minor sides interconnected with the terminal side, and the retention structure defines first and second receiving portions, wherein the first cell is disposed with the first receiving portion with one of the minor sides disposed against the top portion and the other of the minor sides disposed against the bottom portion, and the second cell is disposed with the second receiving portion with one of the minor sides disposed against the top portion and the other of the minor sides disposed against the bottom portion.

20. The assembly of claim 19 wherein the top defines a first ledge disposed against the terminal side of the first cell and a second ledge disposed against the terminal side of the second cell.

* * * * *